UNITED STATES PATENT OFFICE.

GEORG KORNDÖRFER, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

DERIVATIVES OF DIAMINODIOXYARSENOBENZENE.

1,024,993.      Specification of Letters Patent.      Patented Apr. 30, 1912.

No Drawing.      Application filed February 24, 1912. Serial No. 679,663.

*To all whom it may concern:*

Be it known that I, GEORG KORNDÖRFER, Ph. D., chemist, a citizen of the Empire of Germany, residing at Höchst-on-the-Main, Germany, have invented certain new and useful Improvements in Derivatives of Diaminodioxyarsenobenzene, of which the following is a specification.

I have found that by treating with formaldehyde and bisulfite the $3.3^1$-diamino-$4.4^1$-dioxyarsenobenzene, the latter can be converted into an acid capable of forming salts readily soluble in water with a neutral reaction. The procedure for preparing such a salt may, for instance, be as follows: One part of $3.3^1$-diamino-$4.4^1$-dioxyarsenobenzene is suspended in three parts of water and after having added 0.3 parts of a 40% solution of formaldehyde and one part of a 40% solution of sodium bisulfite the suspension is slightly heated on the steam-bath until it is dissolved. From the solution thus obtained the free acid is isolated by the addition of hydrochloric acid, filtered off and well washed. The said acid, when dry, forms a yellowish-red powder, readily soluble in alkalis and rather difficultly soluble in pure water, decomposing without fusion when heated, having the formula:—

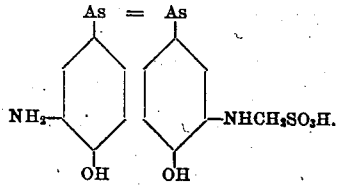

For the purpose of converting the acid into the sodium salt, it is suspended in about 3 parts of water and dissolved by the addition of caustic soda lye or a solution of sodium carbonate until there is a neutral reaction. The solution thus obtained is run in a thin jet, while stirring, into 10–15 times its quantity of alcohol or acetone, whereby the sodium salt is precipitated. The mass is filtered off, washed with alcohol and dried in a vacuum. The dry sodium-salt forms a reddish-brown, easily triturable mass, which very readily dissolves in water with an entirely neutral reaction, is insoluble in strong alcohol, and decomposes without fusion when heated. The same salt is obtained by evaporating to dryness in a vacuum the neutral solution of the acid from the diaminodioxyarsenobenzene. It has the formula:

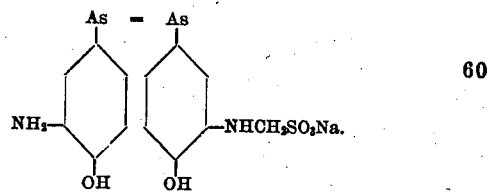

If, instead of caustic soda lye, potassium lye or ammonia are used as neutralizing agents, while operating otherwise in the same manner as above indicated, the corresponding potassium or ammonia-salts are obtained.

Having now described my invention, what I claim is:

1. As new products, derivatives of the $3.3^1$-diamino-$4.4^1$-dioxyarsenobenzene, the radicals of which have the formula:

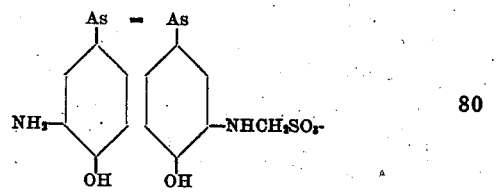

being yellowish-red powders which, when heated, decompose without fusion.

2. As a new product, the derivative of the $3.3^1$-diamino-$4.4^1$-dioxyarsenobenzene, having the formula:

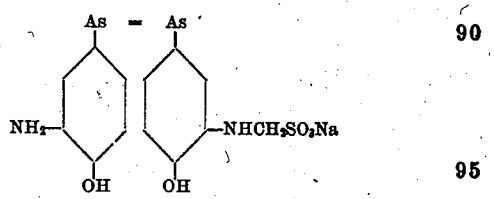

being a yellowish-red powder, which readily dissolves in water with a neutral reaction, and which, when heated, decomposes without fusion.

In testimony whereof, I affix my signature in presence of two witnesses.

GEORG KORNDÖRFER.

Witnesses:
  JEAN GRUND,
  CARL GRUND.